(12) United States Patent
Nam et al.

(10) Patent No.: US 11,888,590 B2
(45) Date of Patent: Jan. 30, 2024

(54) CHANNEL HOPPING-BASED JAMMING DEFENSE SYSTEM FOR WIRELESS LOCAL AREA NETWORKS

(71) Applicant: RESEARCH COOPERATION FOUNDATION OF YEUNGNAM UNIVERSITY, Gyeongsan-si (KR)

(72) Inventors: Seung Yeob Nam, Daegu (KR); Djuraev Sirojiddin, Gyeongsan-si (KR)

(73) Assignee: RESEARCH COOPERATION FOUNDATION OF YEUNGNAM UNIVERSITY, Gyeongsan-si (KR)

( * ) Notice: Subject to any disclaimer, the term of this patent is extended or adjusted under 35 U.S.C. 154(b) by 581 days.

(21) Appl. No.: 17/136,092

(22) Filed: Dec. 29, 2020

(65) Prior Publication Data
US 2022/0173826 A1  Jun. 2, 2022

(30) Foreign Application Priority Data
Dec. 2, 2020  (KR) .......................... 10-2020-0166582

(51) Int. Cl.
*H04K 3/00* (2006.01)
(52) U.S. Cl.
CPC ................ *H04K 3/25* (2013.01); *H04K 3/827* (2013.01)
(58) Field of Classification Search
CPC .......... H04B 1/713; H04B 1/715; H04K 3/22; H04K 3/226; H04K 3/25; H04K 3/42; H04K 3/827; H04W 16/14; H04W 48/18; H04W 48/20; H04W 72/02; H04W 84/02; H04W 84/12; H04W 88/08; H04W 2203/18
USPC ......... 375/132, 133, 259, 260; 370/328–330, 370/332, 345; 342/14–17
See application file for complete search history.

(56) References Cited

U.S. PATENT DOCUMENTS

| | | | |
|---|---|---|---|
| 9,161,214 B2 | 10/2015 | Baras et al. | |
| 2019/0037454 A1* | 1/2019 | Lee | H04W 36/00837 |
| 2019/0141523 A1* | 5/2019 | Ben Henda | H04W 60/02 |

FOREIGN PATENT DOCUMENTS

| | | | |
|---|---|---|---|
| KR | 10-1106102 B1 | 1/2012 | |
| KR | 10-1251629 B1 | 4/2013 | |
| KR | 10-2019-0089346 A | 7/2019 | |
| KR | 10-2058440 B1 | 12/2019 | |
| TW | 201110799 A * | 3/2011 | H04B 17/354 |

* cited by examiner

*Primary Examiner* — Young T. Tse
(74) *Attorney, Agent, or Firm* — NKL Law; Jae Youn Kim

(57) ABSTRACT

Provided is a jamming defense system. In the jamming defense system for wireless local area network communication between an access point (AP) and a user node, the AP that transmits and receives a message to and from the user node generates an AP secret key value by measuring a signal reception strength for the message, and the user node that transmits and receives a message to and from the AP generates a user node secret key value by measuring a signal reception strength for the message.

12 Claims, 5 Drawing Sheets

| Time point section | 1 | 2 | 3 | 4 | 5 | 6 | 7 | 8 | 9 | 10 | 11 | 12 |
|---|---|---|---|---|---|---|---|---|---|---|---|---|
| AP | 1 | 1 | 0 | 3 | 2 | 7 | 2 | 3 | 1 | 5 | 3 | 2 |
| User node 1 | (1) | 7 | 9 | 5 | 1 | (7) | (2) | (3) | (1) | 9 | 0 | 5 |
| User node 2 | 5 | 0 | 2 | (3) | 8 | 6 | (2) | 9 | (1) | 8 | (3) | (2) |
| User node 3 | 2 | (1) | (0) | (3) | 5 | 2 | 8 | (3) | 5 | 7 | 1 | 6 |
| User node 4 | 3 | (1) | 5 | 4 | 3 | (7) | 9 | 6 | 3 | 2 | 0 | (2) |
| User node 5 | 7 | 9 | (0) | 5 | (2) | (7) | 4 | 5 | 2 | (5) | (3) | 1 |
| User node 6 | 4 | 2 | 5 | 8 | 9 | (7) | 1 | 0 | 5 | 4 | 6 | 1 |

FIG. 6

| Time point section | 1 | 2 | 3 | 4 | 5 | 6 | 7 | 8 | 9 | 10 | 11 | 12 |
|---|---|---|---|---|---|---|---|---|---|---|---|---|
| AP | 1 | 1 | 0 | 3 | *9* | 7 | 2 | 3 | 1 | *2* | 3 | *1* |
| User node 1 | (1) | 7 | 9 | 5 | 1 | (7) | (2) | (3) | (1) | 9 | 0 | 5 |
| User node 2 | 5 | 0 | 2 | (3) | 8 | 6 | (2) | 9 | (1) | 8 | (3) | 2 |
| User node 3 | 2 | (1) | (0) | (3) | 5 | 2 | 8 | (3) | 5 | 7 | 1 | 6 |
| User node 4 | 3 | (1) | 5 | 4 | 3 | (7) | 9 | 6 | 3 | (2) | 0 | 2 |
| User node 5 | 7 | 9 | (0) | 5 | 2 | (7) | 4 | 5 | 2 | 5 | (3) | (1) |
| User node 6 | 4 | 2 | 5 | 8 | (9) | (7) | 1 | 0 | 5 | 4 | 6 | (1) |

FIG. 7

CHANNEL HOPPING-BASED JAMMING DEFENSE SYSTEM FOR WIRELESS LOCAL AREA NETWORKS

CROSS-REFERENCE TO RELATED APPLICATIONS

This application claims priority under 35 U.S.C. § 119 to Korean Patent Application No. 10-2020-0166582, filed on Dec. 2, 2020, in the Korean Intellectual Property Office, the disclosure of which is incorporated herein by reference in its entirety.

TECHNICAL FIELD

The present disclosure relates to a channel hopping-based jamming defense system for wireless local area networks (WLAN), and relates to a jamming defense system capable of defending against a jamming attack by calculating a channel to be switched to using a secret key value generated between a user node and an access point (AP) in order to defend against a jamming attack that may occur in a WLAN environment.

BACKGROUND

Jamming generally refers to a radio wave disturbance that interferes with the reception of an original signal arriving at an access point (AP), that is, a receiver, by applying a third signal to a packet signal exchanged in an environment using a wireless local area network (WLAN).

In recent years, wireless communication has become an everyday technology in the living and industrial environments around us, and disturbing wireless communication using a jamming technique can damage our living or security in companies or in the military.

For example, if a Global Positioning System (GPS) is disturbed, a mobile phone may lose its location information, and it is possible to disturb the motion of a fighter plane or missile using GPS information.

Attacks caused by such a jamming technique can be viewed as a type of Denial-of-Service (DoS) attack that occurs at the physical layer, and due to the characteristics that occur at the physical layer, unlike attacks that target servers, cannot be defended with a firewall or an Intrusion Detection System (IDS) used to defend against general cyber attacks, so that research and development to solve this problem are required.

In addition, even if a secret key value is shared in advance between a user and a receiver that communicate with each other in order to avoid an attack caused by the jamming technique, in a case where the secret key value is exposed, information on the next channel may be exposed, and it is difficult to properly avoid the attack. In addition, there is a possibility that the wireless LAN may be disabled again.

On the other hand, as an example of solving this problem, Korean Patent Registration No. 10-1078228, "Detection of DoS attacks in a wireless network environment and countermeasures thereof" discloses only a configuration in which, a DoS attack is detected using a physical channel occupation pattern of the specific signal and the duration of the physical channel occupation of the specific signal, and a configuration in which a channel in use is changed by scanning an emergency Radio Frequency (RF) channel through detecting a Received Signal Strength Indication (RSSI) while a specific signal is received by a wireless main server or a wireless node through a channel in use based on a database (D/B) constructed in advance, and no other configuration has been disclosed to generate individual secret key values between a receiver and a user node in order to defend against an attack by a jamming technique.

In addition, in "Method for forming security information in a WLAN" of Korean Patent Registration No. 10-0628566, only a method for sharing a device key, which is a shared secret key for use by a device and an AP in wireless LAN communication, is disclosed, and no other configuration has been disclosed to generate individual secret key value between a receiver and a user node, select the next channel number, and distribute the yields of channels fairly.

Therefore, there is a need to develop a channel hopping-based jamming defense system for WLAN that avoids an attack by a jamming technique by generating a secret key value in wireless LAN communication between a user node and a receiver and selecting the next channel number using the generated secret key value.

SUMMARY

The present disclosure is proposed to solve the above-described problem, an object thereof is to provide a channel hopping-based jamming defense system for wireless local area networks capable of avoiding an attack by generating a secret key value by using a signal reception strength for a message transmitted and received between an AP and a user node having a plurality of channels, generating the next channel number using the generated secret key value, and periodically switching channels according to the generated channel number.

A jamming defense system according to an embodiment of the present disclosure to solve the above problems is a channel hopping-based jamming defense system including: an access point (AP); and a user node, the access point and the user node performing wireless local area network (WLAN) communication, in which the access point and the user node transmit and receive a plurality of messages to and from each other, the access point generates an AP secret key value by measuring a signal reception strength for a message received by the access point, and the user node generates a user node secret key value by measuring a signal reception strength for a message received by the user node.

At this time, the access point and the user node may share signal strength comparison range information generated using the signal reception strengths recorded in a process of transmitting and receiving the plurality of messages with each other before a current time point, and may generate the AP secret key value and the user node secret key value by comparing the signal strength comparison range information to the signal reception strengths measured for the messages transmitted and received at the current time point; and in the signal strength comparison range information, a section between an upper limit line and a lower limit line may be set to determine a comparison range for comparing the signal reception strengths.

Here, the access point may compare the signal reception strengths for each of the plurality of messages transmitted and received to and from the user node at the current time point to the signal strength comparison range information, and when the signal reception strength of a message is in a range between the upper limit line and the lower limit line, a key value corresponding to the message is not assigned, when the signal reception strength of the message exceeds the upper limit line, the key value corresponding to the message is set to 1, and when the signal reception strength of the message is lower than the lower limit line, the key value corresponding to the message is set to 0; the access point may generate the AP secret key value by sequentially combining the key values respectively set for the each of the plurality of messages; and the user node may compare the signal reception strengths for each of the plurality of messages transmitted and received to and from the access point at the current time point to the comparison range information, and generate the user node secret key value by sequentially combining key values respectively set in a same manner as the access point.

In this case, in the signal strength comparison range information, the upper limit line and the lower limit line may be set based on an average value of the signal reception strengths recorded before the current time point, and the upper limit line and the lower limit line may be determined according to a confidence interval inputted in respect to a standard deviation calculated based on the average value.

Here, when the signal strength comparison range information is generated, the access point and the user node may apply the signal reception strengths measured for the plurality of messages transmitted and received with each other at the current time point to change the comparison range of the signal strength comparison range information.

In addition, in the channel hopping-based jamming defense system according to an embodiment of the present disclosure, when the AP secret key value generated by the access point and the user node secret key value generated by the user node are determined to coincide with each other, a next channel number is generated, and when the AP secret key value and the user node secret key value do not coincide with each other, the AP secret key value and the user node secret key value are corrected.

Here, in the channel hopping-based jamming defense system, when the AP secret key value and the user node secret key value do not coincide with each other, the access point may divide the AP secret key value into sections having a predetermined size and transmits the divided AP secret key value to the user node, and the user node may also the user node secret key value into the predetermined size, sequentially compare the divided user node secret key value to the divided AP secret key value received from the AP to select a section that does not coincide with each other, and regenerate a key value for the non-coinciding section.

Meanwhile, in the channel hopping-based jamming defense system according to an embodiment of the present disclosure, the user node may generate a next channel number for receiving a service from the access point at a next time point from the current time point by using the user node secret key value generated using the signal reception strength of the message transmitted and received to and from the access point, and the access point may generate a next channel number for providing a service to the user node in a same manner as the user node by using the AP secret key value that coincides with the user node secret key value.

At this time, when a plurality of user nodes are to be provided with services, the access point may individually generate an AP secret key value for each of the plurality of user nodes, and individually generate a next channel number for the each of the plurality of user nodes using the individually generated AP secret key values.

In addition, the access point may collate number information of the next channel numbers individually generated for the plurality of user nodes, compare a number of user nodes that are able to receive the services at each of the channel numbers, and select the next channel number having the highest yield to provide the services to the largest number of user nodes.

Furthermore, the access point may record a history of providing a service to a connected user node, cumulatively calculate a sum of the history in which the connected user node is provided with the services to manage the cumulatively calculated sum as a service cumulative value, and when the access point is connected to the plurality of user nodes, the access point may compare the service cumulative value for each of the connected user nodes, and select the next channel number.

Here, when a plurality of next channel numbers having the highest yield are selected, the access point may compare the service cumulative values calculated for the user nodes, and select the next channel number generated by the user node having a lowest service cumulative value to distribute yields of provided services.

In the channel hopping-based jamming defense system according to an embodiment of the present disclosure, the user node and the access point for WLAN communication generate the secret key values by measuring the signal reception strengths for the messages in the process of transmitting and receiving the messages with each other, and generate the next channel numbers for switching the channel at the next time point using the generated secret key values. Therefore, it is possible to avoid a jamming attack on the next channel to be switched to.

In addition, the access point and the user nodes individually generate the secret key values and share different secret key values. Therefore, even if one user node is hacked by a jamming attack, the jamming attack does not extend to attacks on the other user nodes. In addition, the access point determines the yield and fairness of the user nodes when selecting the channel, so that the WLAN communication environment can be kept constant without fluctuation.

BRIEF DESCRIPTION OF THE DRAWINGS

FIG. 6 is a channel selection table in which a next channel number is selected by the channel number selection algorithm.

FIG. 7 is a channel selection table in which the channel number selection correction algorithm is applied to the channel selection table of FIG. 6.

DETAILED DESCRIPTION OF EMBODIMENTS

Figure 1:
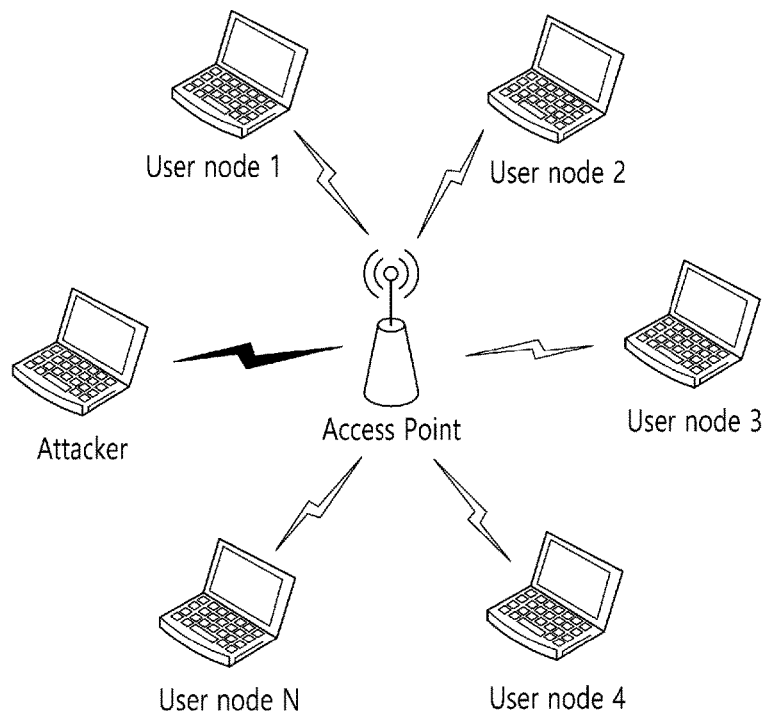
FIG. 1 is a diagram showing a basic configuration of a channel hopping-based jamming defense system for wireless local area networks (WLAN) according to an embodiment of the present disclosure.

Hereinafter, the description of the present disclosure with reference to the drawings is not limited to a specific embodiment, and various modifications may be applied and various embodiments may be provided. In addition, the content described below should be understood to include all modifications, equivalents, and substitutes included in the spirit and technical scope of the present disclosure.

In the following description, terms such as first and second are terms used to describe various elements, and their meanings are not limited thereto, and are used only for the purpose of distinguishing one element from other elements.

The same reference numerals used throughout the present specification denote the same elements.

Singular expressions used in the present disclosure include plural expressions unless the context clearly indicates otherwise. In addition, terms such as "comprise", "include", or "have" described below should be interpreted to designate the presence of features, numbers, steps, operations, elements, components, or combinations thereof described in the specification, and should be understood not to exclude the presence or addition of one or more other features, numbers, steps, operations, elements, components, or combinations thereof.

Hereinafter, a jamming defense system according to an embodiment of the present disclosure will be described in detail with reference to FIGS. 1 to 4.

Figure 2:
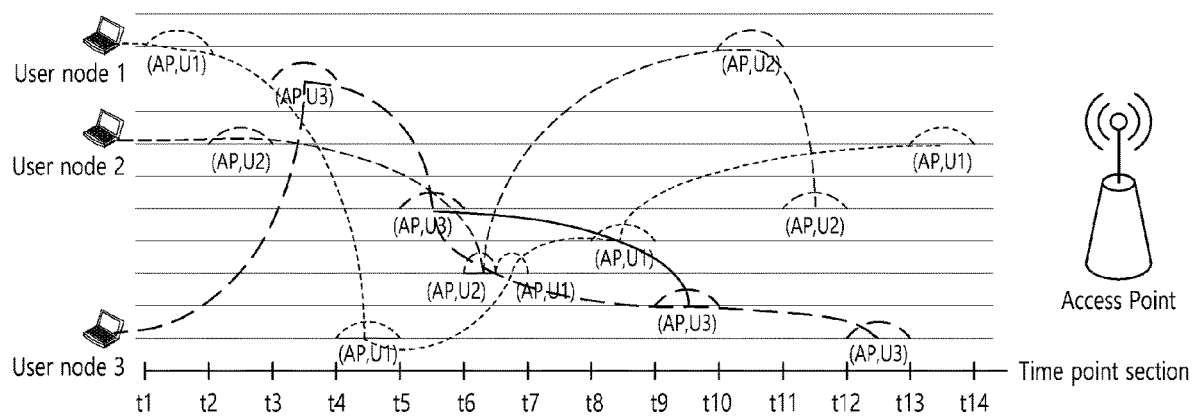
FIG. 2 is a diagram showing a state in which channels are switched according to a time point of the WLAN jamming defense system.
Figure 3:
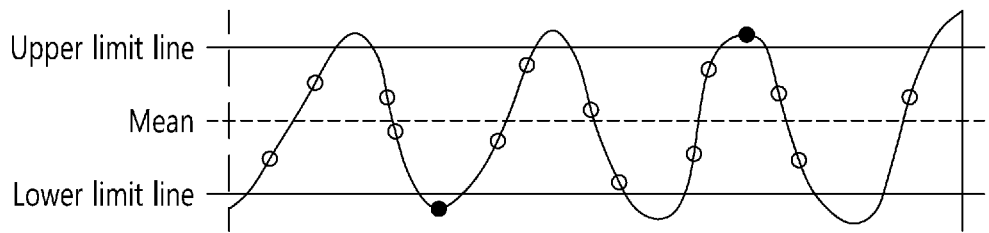
FIG. 3 is a diagram showing a state in which comparison range information forming a certain range and a reception signal strength are compared to each other.

FIG. 1 is a diagram showing a basic configuration of a channel hopping-based jamming defense system for wireless local area networks (WLAN) according to an embodiment of the present disclosure, FIG. 2 is a diagram showing a state in which channels are switched according to a time point of the WLAN jamming defense system, and FIG. 3 is a diagram showing a state in which comparison range information forming a certain range and a reception signal strength are compared to each other.

Referring to FIGS. 1 to 3, a channel hopping-based jamming defense system 1 for WLAN according to the embodiment of the present disclosure may include a user node 20 and an access point (AP) 10.

First, the channel hopping-based jamming defense system 1 for WLAN according to the embodiment of the present disclosure includes user nodes 20 and an access point (AP) 10 that communicates with the user nodes 20 as shown in FIGS. 1 and 2, and may propose a system for paralyzing jamming by switching channel numbers for communication between the user node 20 and the AP 10 at each of time points when the time points are divided into predetermined sections in order to avoid an attack by a jamming technique from the outside in providing a service to the user nodes 20 by the AP 10 for wireless communication.

At this time, the AP 10 and the user node 20 may derive a value for forming a certain rule by using a reception signal strength detected in a process of transmitting and receiving messages with each other, and may generate a secret key value using the derived value.

In more detail, the AP 10 and the user node 20 may periodically transmit and receive messages with each other, and measure signal reception strengths for the messages respectively received by the AP 10 and the user node 20.

At this time, the AP 10 and the user node 20 transmit and receive messages at regular time intervals, and the interval at which the messages are transmitted and received may be changed according to a preset time interval. However, it is preferable that the time interval at which a plurality of user nodes 20 formed for one AP 10 transmit and receive messages is set to be always constant.

Here, the same communication environment is established between the AP 10 and the user node 20, so that the signal reception strength for the message measured by the AP 10 and the signal reception strength for the message measured by the user node 20 can be regarded as being measured with the same or similar strength, and it can be determined that the same information is generated in a process of generating a key value of a certain pattern by using the measured signal reception strengths.

Referring to FIG. 3, the channel hopping-based jamming defense system 1 according to the embodiment of the present disclosure may compare measured signal reception strengths using comparison range information.

In more detail, the comparison range information may be generated by collecting signal reception strengths for messages transmitted and received before the current time point, and the generated comparison range information may be shared by the AP 10 and the user node 20.

Here, the comparison range information may be generated by using the record of the signal reception strengths for all messages transmitted and received before the current time point, but is not limited thereto. A period may be set, and the comparison range information may be generated using the record of signal reception strengths for messages transmitted and received within the set period.

For example, in a case where the collection period is set to one year, the comparison range information may be generated by collecting the record of signal reception strengths for one year from the current time point, and in a case where the collection period if set to three years, the comparison range information may be generated by collecting the record of signal reception strengths for three years.

Here, the comparison range information may be input to each of the AP 10 and the user node 20 before starting wireless communication between the AP 10 such that the measured signal reception strengths can be analyzed when the communication is started and messages are transmitted and received.

Alternatively, unlike the method for inputting the comparison range information before starting communication, the comparison range information can be generated by calculating the signal reception strengths respectively collected by the AP 10 and the user node 20. Preferably, the AP 10 and the user node 20 can collect signal reception strengths before the current time point and generate the comparison range information.

In the case where the AP 10 and the user node 20 collect the signal reception strengths before the current time point and generate the comparison range information, the signal reception strengths for the messages transmitted and received at the current time point may be recorded to be applied in a process of generating a secret key value in the next channel.

In more detail, the AP 10 and the user node 20 may record the signal reception strengths for the messages transmitted and received at the current time point so as to be applied to the comparison range information at the next time point, and the comparison range information can be calculated in real time in a process of continuous communication between the AP 10 and the user node 20.

The comparison range information generated by the AP 10 and the user node 20 or input from the outside in advance may be formed based on the average value of the collected signal reception strengths as shown in FIG. 2, and an upper limit line and a lower limit lint may be determined from the average value of the collected signal reception strengths to provide a comparison range for signal reception strengths.

In more detail, the upper limit line and the lower limit line of the comparison range information may be formed according to a certain criterion for the average value, and preferably, the upper limit line and the lower limit line may be set by setting a confidence interval of a standard deviation calculated for the collected signal reception strengths.

For example, in a case where the confidence interval is set to 50%, the signal reception strength at the upper 50% of the confidence interval of the calculated standard deviation may be set as the upper limit line, the signal reception strength at the lower 50% may be set as the lower limit line, and the range between the upper limit line and the lower limit line may be set as the comparison range information.

Here, the criterion for setting the upper limit line and the lower limit line of the comparison range information may be set as the confidence interval for the above standard deviation, but is not limited thereto, and may be set as a section directly input according to an arbitrary criterion. It is also possible to apply another calculation method and set a range to be compared.

The AP 10 and the user node 20 may set key values by comparing the signal reception strengths measured for the messages transmitted and received with each other to the comparison range information, and may set key value by comparing the comparison range information to the measured signal reception strengths as shown in FIG. 2.

In more detail, in a case where the signal reception strength measured for a message received by the AP 10 at regular intervals is measured to be within the strength range formed by the upper limit line and the lower limit line, a key value for the message is not set. In a case where the measured signal reception strength is measured with a strength higher than the upper limit line or a strength lower than the lower limit line, a key value can be set for the message.

In this case, the key value for the message indicating a strength higher than the upper limit line may be set to "1", and the key value for the message indicating a strength lower than the lower limit line may be set to "0".

For example, when the measured signal reception strength is displayed on the comparison range information as shown in FIG. 2, messages within the range between the upper limit line and the lower limit line are ignored, a key value of "0" is assigned to the message indicating a strength lower than the lower limit line, and a key value of "1" is assigned to the message indicating a strength higher than the upper limit line, the key value in the measured section may be combined as "0, 1".

In this case, the key values assigned by comparison to the comparison range information may be arranged in a time sequence in which the messages are transmitted and received to generate an AP secret key value.

Here, the user node 20 generates a user node secret key value for the messages transmitted and received to and from the AP 10 in the same manner as the AP 10 generates the secret key value by comparison to the comparison range information.

In the channel hopping-based jamming defense system 1 for WLAN according to the embodiment of the present disclosure, the intensity of the signal reception strength measured for the message transmitted and received by the AP 10 to and from the user node 20 and the intensity of the signal reception strength measured by the user node 20 are regarded as being measured in the same or close level, and in a case where the secret key values are derived using the same comparison range information, the AP secret key value and the user node secret key value coincide with each other.

At this time, in a case where the AP secret key value and the user node secret key value coincide each other, the number of the channel to be switched to at the next time point is generated using each of the generated secret key values, and in a case where the secret key values do not coincide with each other, the secret key values thereof may be caused to coincide with each other through correction.

The AP 10 and the user node 20 may generate the number of the channel to be switched to at the next time point by using the respective secret key values, and may determine the number of the channel generated through the secret key values as the next channel number. That is, the AP 10 and the user node 20 may generate the next channel number using the secret key values.

A process of generating the next channel number will be described later in more detail.

On the other hand, in a case where the AP secret key value and the user node secret key value do not coincide with each other, correction may be performed to cause the secret key values thereof to coincide with each other. At this time, the AP 10 and the user node 20 each divide data on which the respective secret key values are recorded into predetermined sizes and compare the data.

For example, in a case where the AP secret key value is generated as "10110010" and the user node secret key value is generated as "11010011", the AP 10 divides each data into "1", "0", "1", "1", "0", "0", "1", "0", the user node 20 divides each data into "1", "0", "1", "1", "0", "0", "1", and "1" to compare the divided data. Collection may be performed on a section that is not coincident, that is, "0" which is the last data of the AP secret key value, and "1" which is the last data of the user node secret key value.

Here, for the correction for the data that is not coincident, data that is not coincident in the data information divided by the AP 10 may be transmitted to the user node 20 to allow the user node 20 to change the data that is not coincident. In contrast, the user node 20 may transmit the data that is not coincident to the AP 10 to cause the AP 10 to change the data. Preferably, information on the data that is not coincident may be transmitted from the user node 20 to the AP 10 so that the AP 10 corrects the AP secret key value to cause the secret key values thereof to coincide with each other.

In addition, a method for correcting the AP secret key value and the user node secret key value to coincide with each other is not limited to the above description, and correction may be performed by various algorithms or methods capable of correction.

That is, in the channel hopping-based jamming defense system 1 for WLAN according to the embodiment of the present disclosure, the AP 10 and the user node 20 generate the secret key values using the reception signal strengths of the messages transmitted and received in real time, so that it may be difficult for an attacker 30 such as an external hacker to acquire the secret key values for communication by a jamming technique. In addition, even in a case where the AP secret key value and the user node secret key value do not coincident with each other, correction is achieved by exchanging information with each other only for the divided data, so that the entire secret key values cannot be known even if some of the divided data for the secret key values are secured from the outside.

Figure 4:
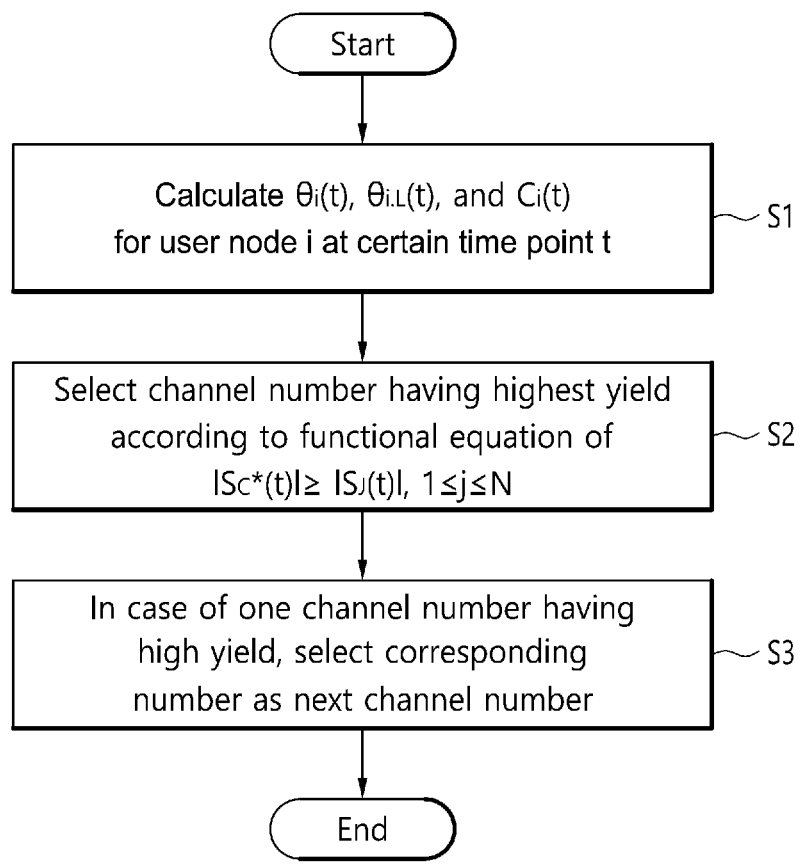
FIG. 4 is a diagram showing a flow of a channel selection algorithm for selecting a channel using secret key values of the channel hopping-based jamming defense system for WLAN according to the embodiment of the present disclosure.

FIG. 4 is a diagram showing a flow of a channel number selection algorithm for selecting a channel using the secret key values of the channel hopping-based jamming defense system for WLAN according to the embodiment of the present disclosure.

Referring to FIG. 4, the channel hopping-based jamming defense system 1 according to the embodiment of the present disclosure may generate the number of a channel to be switched to at the next time point by using the secret key values generated by the AP 10 and the user node 20, and the AP 10 can select the number of the channel to be switched to at the next time point using the channel number selection algorithm from next channel numbers respectively generated by the plurality of user nodes 20 formed in one AP 10.

First, the AP 10 and the user node 20 may generate channel numbers at the next time point by using the respective generated secret key values.

At this time, the channel number to be switched to at the next time point, that is, the next channel number, can be generated using a function equation set in advance in the AP 10 and the user node 20, and can be generated using various function equations set in advance.

Here, even if information on the function equation is exposed from the attacker 30, such as an external hacker, since information on the secret key values generated at the current time point cannot be grasped, a situation in which user node hacking may occur using a jamming technique rarely occurs. It is preferable that the functional equation for obtaining the next channel number can be expressed as in the following calculation equation (1).

$$c_i(t+1) = H(c_i(t) \| k_{AP,i} \| TS) \% N, t \geq 0 \quad \text{Calculation Equation (1)}$$

where $c_i(t)$ means the channel number selected by a user node i at a time or a certain time point t, $K_{AP,i}$ indicates information on the secret key values generated by the AP 10 and the user node 20, TS means the unit of seconds at the current time point, and N means the total number of channels formed in the AP 10.

That is, the meaning of the function included in HO means that one number is generated among the total number of channels formed in the AP 10 using the channel number of the user node i at the current time point t and the information on the secret key values generated by the AP 10 and the user node 20, and the channel number generated here can be determined to be generated as $c_i(t+1)$, that is, the next channel number for the user node i at the next time point.

At this time, the next channel number may be individually generated for each of the plurality of user nodes 20 connected to one AP 10, and when the next channel number for each of the user nodes 20 is generated, in a state in which the information on each of the next channel numbers is acquired using the channel number selection algorithm, the AP 10 may select a channel at the next time point in consideration of all fairness between the user nodes while having the maximum transmission rate in the network.

That is, in a state in which the next channel number for each of the user nodes is acquired, the AP 10 may select a channel according to the flow of the channel number selection algorithm for selecting a channel number as shown in FIG. 4.

First, in S1, in order to select the channel number to be switched to at the next time point, $\theta i(t)$ (: expected throughput information for the user node i at a certain time t), $\theta i, L(t)$ (: cumulative throughput information processed by the user node i during an L period, which is a certain time section before the current time point), and $C_i(t)$ (: channel number selected by the user node i at a certain time point t) for each of the user nodes at a certain time or at a certain time point t are calculated.

In S2, the next channel number generated highest among the next channel numbers selected for each of the user nodes at a predetermined time t may be compared.

In more detail, $S_C(t)$ of S2 means the set or number of user nodes for the next channel number generated at a certain time point t, and the AP 10 may collate information on the next channel numbers respectively generated by the user nodes and then compare the set or number of user notes for each of the channel numbers.

S3 is a step of selecting a channel number to be switched to at the next time point t+1 for the most generated channel number among the next channel numbers respectively generated by the user nodes in S2.

At this time, S3 may select the channel number as the channel number to be switched to at the next time point t+1 when one channel number is selected in S2.

In this case, $C_{AP}(t)$ may mean the channel number selected by the AP 10 at a certain time point t.

Figure 5:
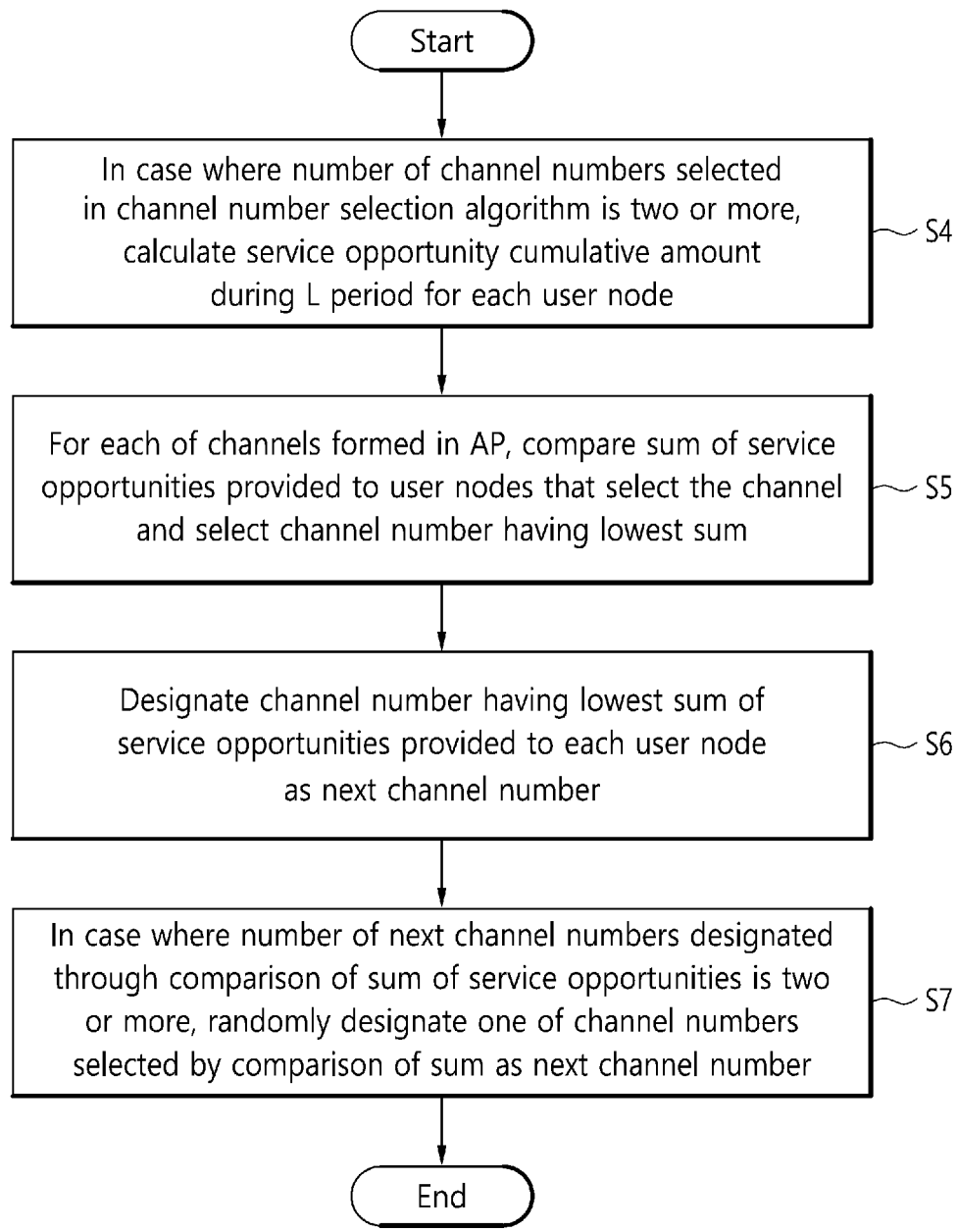
FIG. 5 is a diagram showing a flow of a channel selection correction algorithm for performing correction to distribute a yield for the channel selection algorithm of FIG. 4.

FIG. 5 is a diagram showing a flow of a channel selection correction algorithm for performing correction to distribute a yield for the channel selection algorithm of FIG. 4, FIG. 6 is a channel selection table in which the next channel number is selected by the channel number selection algorithm, and FIG. 7 is a channel selection table in which the channel number selection correction algorithm is applied to the channel selection table of FIG. 6.

Referring to FIGS. 5 to 7, in the channel hopping-based jamming defense system 1 for WLAN according to the embodiment of the present disclosure, in a case where a plurality of channel numbers are selected in the channel selection algorithm, in order to select one channel number, the channel number to be switched to may be selected according to the flow of the channel selection correction algorithm.

In a case where the number of next channel numbers selected according to the channel number selection algorithm in the AP 10, that is, the number of next channel numbers selected according to S2 is two or more, the number with the highest expected throughput is not selected, and the next channel number selected by the channel number selection algorithm may be corrected by applying the channel number selection correction algorithm in order to maintain the fairness of the services provided to the plurality of user nodes 20 by the AP 10.

First, in S4 of the channel number selection correction algorithm, a case where the number of next channel numbers selected in S2 of the channel number selection algorithm is two or more is recognized, and each of the user nodes 20 may calculate opportunities to receive a service from the AP 10 during the L period, which is a certain period before the current time point.

Here, $GAOc_i(t)$ of S4 may mean the sum of opportunities for the nodes that have selected Ci as the next channel number to receive a service from the AP 10 during the last L period.

At this time, the L period can be set to an integer multiple of one time point period when a channel change period according to a certain time point is assumed to be one time point section, but is not limited thereto. It is possible to variably set the period depending on the storage capacity in the server or each of the AP 10 and the user nodes 20 of the system according to the embodiment of the present disclosure.

In S5, the cumulative amount of service opportunities provided from the AP 10 to each of the user nodes 20 calculated in S4 is considered and compared to the sum of the service opportunities provided to the user nodes that have selected the channel as the next channel number for each of the channels, and the channel number with the lowest sum of the services may be selected.

That is, the number of times at which the next channel number generated by the user node 20 at each time point coincides with the next channel number selected by the AP 10 within the L period is recognized and compared to opportunities to provide the service, and the channel number with the lowest sum of the services of the user nodes that have selected the channel as the next channel number may be confirmed.

S6 denotes a step in which the AP 10 designates the channel number with the lowest sum of the services confirmed in S5 as the next channel number.

That is, in the channel number selection correction algorithm, in a case where the number of derived next channel numbers selected in the channel number selection algorithm is two or more, the channel in which the amount of recent services provided to the user nodes, that is, the sum of the services provided from the AP 10 is selected from the two channels, whereby the next channel number selected by the AP 10 may be corrected so that service opportunities can be distributed as fairly as possible.

In this case, in a case where the number of next channel numbers selected in S6 is two or more, in S7, the AP 10 may randomly select one of the remaining channels in S6 as the next channel number.

Referring to FIGS. 6 and 7, a series of examples in which the channel hopping-based jamming defense system 1 for WLAN according to the embodiment of the present disclosure selects and corrects a channel using the channel number selection algorithm and the channel number selection correction algorithm can be checked.

Here, in the tables shown in FIGS. 6 and 7, the AP 10 row means the next channel number selected at each of time points, and each user node 20 row means the next channel number generated at each of the time points by the corresponding user node 20.

The channel hopping-based jamming defense system 1 for WLAN according to the embodiment of the present disclosure may select the next channel number as shown in FIG. 6 in the case of using the channel number selection algorithm.

For example, at time point No. 1, since next channel numbers respectively generated by the user nodes 20 are different from each other, the same yield is shown for each of channel numbers. At this time, the AP 10 may select one channel based on the predictable throughput of each of the user nodes 20 or randomly.

On the other hand, in the case of next channel numbers respectively generated by the user nodes 20 at time point No. 2, while the next channel numbers generated by user node 20 Nos. 1, 2, 5, and 6 are different from each other, the next channel number generated by user node 20 Nos. 3 and 4 are generated as the same number, so that the AP 10 may select No. 3 with the highest yield as the next channel number.

At this time, in the case of channel number Nos. 0 and 5 confirmed to have the same yield at time point No. 3, a channel number having a high expected throughput may be selected.

On the other hand, when the channel number selection correction algorithm is applied, as shown in FIG. 7, the next channel number at some time points may be selected differently.

For example, in the case of time point No. 5, while channel number No. 2 is selected in FIG. 6 to which only the channel number selection algorithm is applied, in FIG. 7 to which the channel number selection correction algorithm is applied, collection is performed to select channel number No. 9 at time point No. 5, and it can be seen that the next channel number is changed.

In the above correction, when the cumulative opportunity to provide the service from the AP 10 to each of the user nodes 20 from time point No. 1 to time point No. 4 is calculated, since the opportunity to provide the service to user node 20 No. 6 has never been confirmed, collection is performed to select channel number No. 9, which is the next channel number generated by user node 20 No. 6 at time point No. 5.

In addition, in the case of time point No. 10, when the cumulative opportunities of user node 20 Nos. 4 to 6 from time point No. 1 to time point No. 9 are compared to each other, the same yield is confirmed. Therefore, one channel number may be randomly selected from among the next channel numbers generated by user node 20 Nos. 4 to 6, and as shown in FIG. 7, it can be seen that No. 2 which is the next channel number generated by user node No. 4 is randomly selected.

That is, in the channel hopping-based jamming defense system 1 for WLAN according to the embodiment of the present disclosure, the AP 10 and the plurality of user nodes 20 formed generate their respective secret key values through the messages individually transmitted and received by the user nodes 20 and generate the next channel numbers to be switched to at the next time point using the generated secret key values so that it is difficult to grasp the next channel number to be switched to from the outside. Even if one user node 20 is hacked by a jamming technique, it may be difficult to check information on the next channel to be switched to.

In addition, since the user nodes 20 generate a different secret key values, even if the attacker 30 such as an external hacker succeeds in attacking one user node 20, the system can be formed so that the remaining user nodes 20 can be defended.

Figure 8:
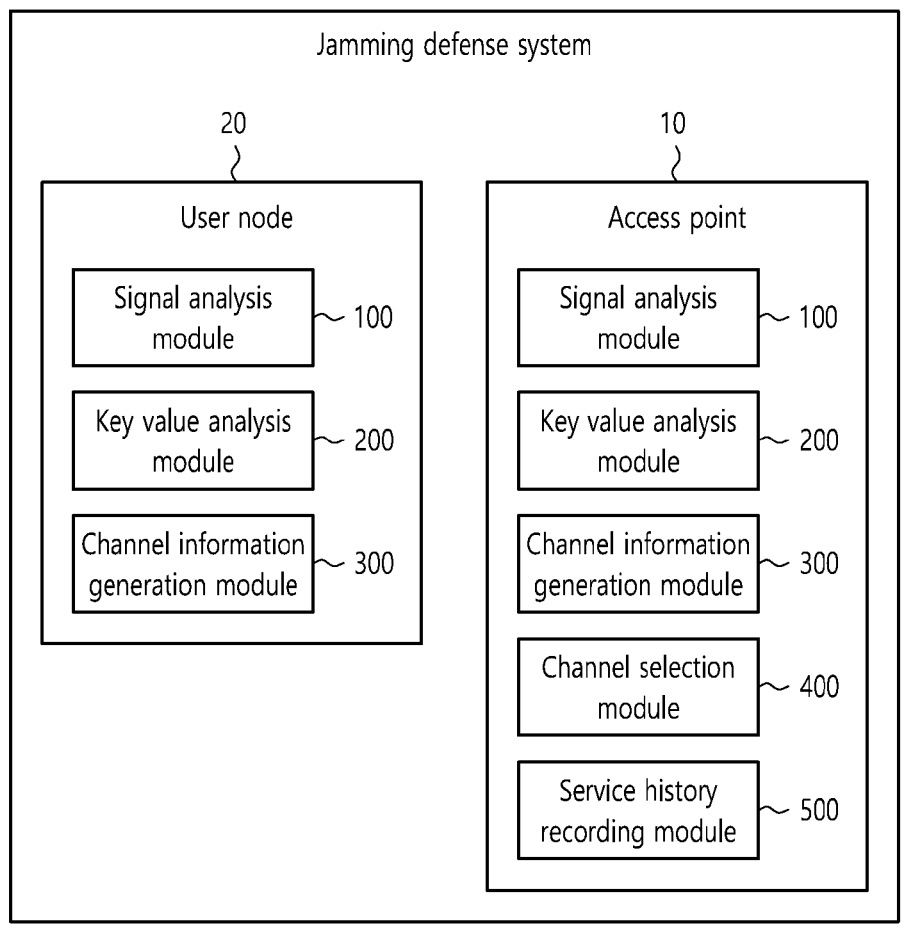
FIG. 8 is a diagram showing a detailed configuration of an access point (AP) and a user node of the channel hopping-based jamming defense system for WLAN according to the embodiment of the present disclosure.

FIG. 8 is a diagram showing a detailed configuration of the AP and the user node of the channel hopping-based jamming defense system for WLAN according to the embodiment of the present disclosure.

Referring to FIG. 8, the AP 10 and the user node 20 of the channel hopping-based jamming defense system 1 for WLAN according to the embodiment of the present disclosure may be configured to identically include a signal analysis module 100, a key value analysis module 200, and a channel information generation module 300.

The AP 10 and the user node 20 may measure the signal reception strengths for the messages in the process of transmitting and receiving the messages with each other, but may allow the signal analysis module 100 to measure the signal reception strengths for the messages.

At this time, the signal analysis modules 100 formed in the AP 10 and the user node 20 can measure the signal reception strengths for the respectively received messages based on the same criterion, and may record and simultaneously share the measured signal reception strengths with the key value analysis module 200.

The key value analysis module 200 may compare the signal reception strength shared by the signal analysis module 100 with the comparison range information to derive a key value.

At this time, the comparison range information is stored in the key value analysis module 200, and the signal reception strength shared by the signal analysis module 100 is compared to the comparison range information to derive a key value for each of the messages.

In addition, the key value analysis module 200 may generate the secret key values for the AP 10 and the user node 20 by combining the key values respectively derived for the messages in a time sequence.

The channel information generation module 300 may generate a next channel number for the AP secret key value and the user node secret key value generated by the key value analysis module 200.

In this case, the channel information generation module 300 may generate the next channel number for each of the AP 10 and the user node 20 by using the same functional equation as in the above calculation equation (1).

Furthermore, as shown in FIG. 8, the AP 10 may be configured to include a channel selection module 400 and a service history recording module 500.

The channel selection module 400 selects a channel number for providing a service to the user node 20 by the AP 10 at each time point by using information on the next channel number generated by the channel information generation module 300, whereby the channel selection module 400 according to the embodiment of the present disclosure may select the channel number for providing the service to the user node 20 by the AP 10 according to the same flow as the channel number selection algorithm and the channel number selection correction algorithm.

The service history recording module 500 may be formed to record the history of the AP 10 providing services to the user node 20 from the current time point to before a predetermined period.

At this time, regarding the period during which the service history recording module 500 records information, records of a certain period that can be stored based on the current time point, that is, one to three days depending on a storage space may be stored, and information on the service provision amounts and the service provision opportunities provided to the user nodes 20 for a certain period such as 14 days or 28 days may be stored.

While the embodiments of the present disclosure have been described above with reference to the accompanying drawings, it can be understood that those of ordinary skill in the art to which the present disclosure belongs can be implemented in other specific forms without changing the technical spirit or essential features of the present disclosure. Therefore, the embodiments described above are illustrative and non-limiting in all respects.

DETAILED DESCRIPTION OF MAIN ELEMENTS

1: Jamming defense system
10: AP
20: User node
30: Attacker
100: Signal analysis module
200: Key value analysis module
300: Channel information generation module
400: Channel selection module
500: Service history recording module

What is claimed is:

1. A channel hopping-based jamming defense system comprising:
an access point (AP); and
a user node,
wherein the access point and the user node perform wireless local area network (WLAN) communication,
wherein the access point and the user node transmit and receive a plurality of messages to and from each other,
wherein the access point generates an AP secret key value by measuring a signal reception strength for a message received by the access point, and
wherein the user node generates a user node secret key value by measuring a signal reception strength for a message received by the user node.

2. The channel hopping-based jamming defense system of claim 1,
wherein the access point and the user node share signal strength comparison range information generated using the signal reception strengths recorded in a process of transmitting and receiving the plurality of messages with each other before a current time point, and generate the AP secret key value and the user node secret key value by comparing the signal strength comparison range information to the signal reception strengths measured for the messages transmitted and received at the current time point, and
wherein in the signal strength comparison range information, a section between an upper limit line and a lower limit line is set to determine a comparison range for comparing the signal reception strengths.

3. The channel hopping-based jamming defense system of claim 2, wherein:
the access point compares the signal reception strengths for each of the plurality of messages transmitted and received to and from the user node at the current time point to the signal strength comparison range information,
when the signal reception strength of a message is in a range between the upper limit line and the lower limit line, a key value corresponding to the message is not assigned,
when the signal reception strength of the message exceeds the upper limit line, the key value corresponding to the message is set to 1,
when the signal reception strength of the message is lower than the lower limit line, the key value corresponding to the message is set to 0,
the access point generates the AP secret key value by sequentially combining the key values respectively set for the each of the plurality of messages, and
the user node compares the signal reception strengths for each of the plurality of messages transmitted and received to and from the access point at the current time point to the signal strength comparison range information, and generates the user node secret key value by sequentially combining key values respectively set in a same manner as the access point.

4. The channel hopping-based jamming defense system of claim 2, wherein:
in the signal strength comparison range information, the upper limit line and the lower limit line are set based on an average value of the signal reception strengths recorded before the current time point, and
the upper limit line and the lower limit line are determined according to a confidence interval inputted in respect to a standard deviation calculated based on the average value.

5. The channel hopping-based jamming defense system of claim 4,
wherein, when the signal strength comparison range information is generated, the access point and the user node apply the signal reception strengths measured for the plurality of messages transmitted and received with each other at the current time point to change the comparison range of the signal strength comparison range information.

6. The channel hopping-based jamming defense system of claim 1,
wherein when the AP secret key value generated by the access point and the user node secret key value generated by the user node are determined to coincide with each other, a next channel number is generated, and
wherein when the AP secret key value and the user node secret key value do not coincide with each other, the AP secret key value and the user node secret key value are corrected.

7. The channel hopping-based jamming defense system of claim 6,
wherein, when the AP secret key value and the user node secret key value do not coincide with each other, the access point divides the AP secret key value into sections having a predetermined size and transmits the divided AP secret key value to the user node, and
wherein the user node divides the user node secret key value into the predetermined size, sequentially compares the divided user node secret key value to the divided AP secret key value received from the AP to select a section that does not coincide with each other, and regenerates a key value for the non-coinciding section.

8. The channel hopping-based jamming defense system of claim 1, wherein:
the user node generates a next channel number for receiving a service from the access point at a next time point from a current time point by using the user node secret key value generated using the signal reception strength of the message transmitted and received to and from the access point, and
the access point generates a next channel number for providing a service to the user node in a same manner as the user node by using the AP secret key value that coincides with the user node secret key value.

9. The channel hopping-based jamming defense system of claim 8, wherein, when a plurality of user nodes is to be provided with services, the access point individually generates an AP secret key value for each of the plurality of user nodes, and individually generates a next channel number for the each of the plurality of user nodes using the individually generated AP secret key values.

10. The channel hopping-based jamming defense system of claim 9, wherein the access point collates number information of the next channel numbers individually generated for the plurality of user nodes, compares a number of the user nodes that are able to receive the services at each of the next channel numbers, and selects the next channel number having the highest yield to provide the services to the largest number of the user nodes.

11. The channel hopping-based jamming defense system of claim 10,
wherein the access point records a history of providing a service to a connected user node, cumulatively calculates a sum of the history in which the connected user node is provided with the services to manage the cumulatively calculated sum as a service cumulative value, and
wherein when the access point is connected to the plurality of user nodes, the access point compares the service cumulative value for each of the connected user nodes, and selects the next channel number.

12. The channel hopping-based jamming defense system of claim 11,
wherein, when a plurality of next channel numbers having the highest yield are selected, the access point compares the service cumulative values calculated for the user nodes, and selects the next channel number generated by the user node having a lowest service cumulative value to distribute yields of provided services.

* * * * *